March 31, 1942.   A. E. DUTFIELD ET AL   2,278,348
MOUNTING OF WINDOWS AND LIKE PANELS
Filed Jan. 11, 1940
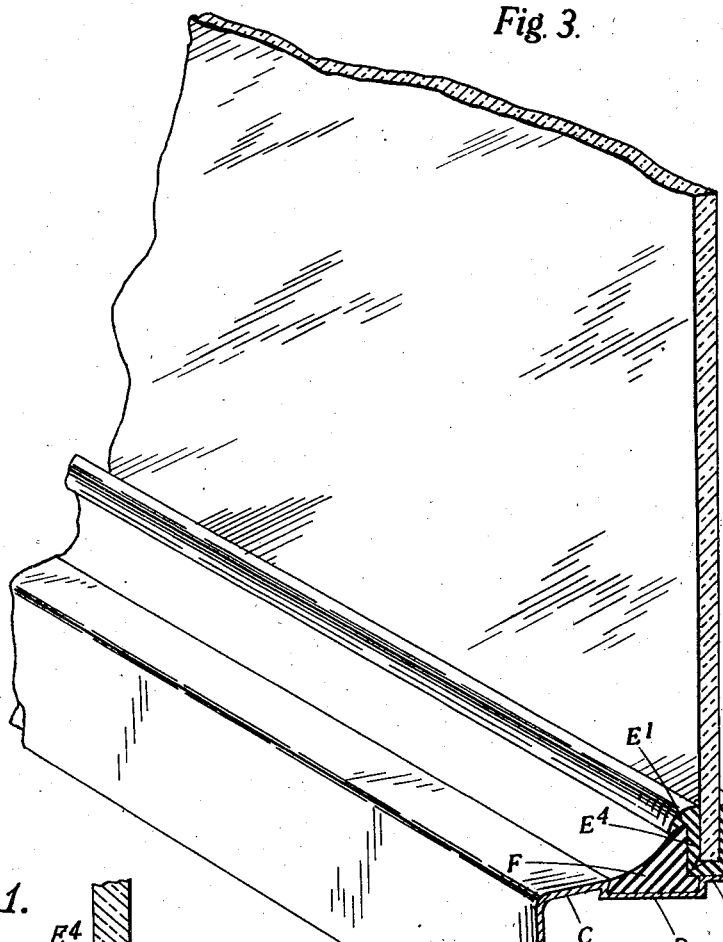
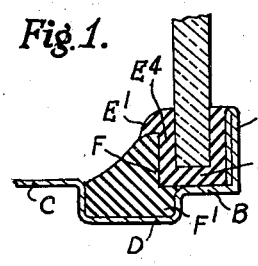
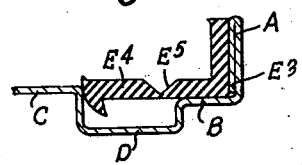
Inventors
A. E. Dutfield and
G. J. Rawlings
by
C. F. Wendroth
Attorney Patented Mar. 31, 1942

2,278,348

UNITED STATES PATENT OFFICE 2,278,348

MOUNTING OF WINDOWS AND LIKE PANELS

Albert Ernest Dutfield, Streatham Park, London, and Ernest John Rawlings, Putney, London, England, assignors to Rawlings Manufacturing Company Limited, London, England, a British company Application January 11, 1940, Serial No. 313,444
In Great Britain July 20, 1938

5 Claims. (Cl. 189—78)

This invention relates to the mounting of windows and like panels in frames and more particularly to mounting by means of a metal frame in which is fitted a resilient seating member embracing the edge of the glass panel or window.

In known resilient seating members having a substantially U-shaped rubber channel portion for the reception of the edge of the glass panel and a laterally extending rubber portion integral with the U-shaped portion and serving as a buttress with respect to the outer wall of the channel, considerable care and time is required to seat the entire rubber seating member in the metal receiving frame or so-called pan, especially when the latter is formed with a receiving groove or channel to secure the entire seating member in position. The chief object of the present invention is to provide an improved form of resilient seating for the edge of the glass panel or window and more particularly to provide for greater ease of assembly, securing, and dismantling, and less liability to damage the seating; incidentally the metal frame itself is suited to the improved resilient seating.

According to the present invention the mounting consists of a metal frame having a groove or channel extending along the base thereof, a glass-receiving substantially U-shaped rubber strip seated on the base of the metal frame and composed of a substantially L-shaped limb and a tip-up flap integrally connected with the outer edge of the base portion of said L-shaped limb, and a separate strip-like packing or finishing piece of rubber engaging at its base wholly or in part in the said groove or channel in the base of the metal frame and engaging at one side with the adjacent wall of the substantially U-shaped rubber strip as a buttress therefor.

The employment of a seating member composed of a channel-shaped or channel-forming strip and a finishing piece of rubber as separately seatable components presents an advantage over a single seating member with integral side strip solid therewith in that the separately seatable finishing piece can be fitted in position after the placing in position of the glass panel with seating member.

The rubber packing or finishing piece is conveniently of approximately triangular shape in cross-section, and the upstanding wall of the U-shaped strip engaged by one of the sides of the finishing piece is preferably formed with an overhanging bead to engage and slightly overhang the adjacent acute angled edge of the finishing piece.

The employment of a U-shaped strip composed of an L-shaped limb and a tip-up flap presents the important advantage that it does not have to be mounted on the edge of the glass followed by fitting of the assembly somewhat blindly into the metal frame but on the contrary the resilient member (with its flap unfolded) may first be placed in the metal frame followed by the placing of the glass in position with its edge in full view and finally by the folding up of the flap. Thereafter the finishing piece is fitted in position.

In order that the invention may be clearly understood and readily carried into effect we will now describe the same more fully with reference to the accompanying drawing in which—

Figures 1 and 2 are cross-sectional views of the new mounting.

Figure 3 is a part-perspective part-cross-sectional view of an improvement of the embodiment of Figures 1 and 2.

The metal frame consists of an upstanding wall A, and a base composed of two parts B and C connected by an intervening channel D. The base part C is preferably slightly lower than the base part B so as not to offer frictional resistance to the entry of the U-shaped rubber strip E constituted by the L-shaped limb $E^3$ and the tip-up flap $E^4$. F is the strip-like packing or finishing piece which is roughly triangular in shape and acts as a buttress against the outer wall of the U-shaped strip as shown in Figure 2.

The inter-engagement of the parts $E^4$ and F may be strengthened and made neater by providing an overhanging lip or bead $E^1$ on the part $E^4$ to engage the adjacent acute-angled edge of the part F.

If the U-shaped strip were of permanent channel section it will be realised that the normal procedure would be for this strip to be fitted onto the edge of the glass panel before the latter is placed in position in the metal frame. This has several disadvantages, one being that time and patience are needed to get the glass edge into the channel (especially at corners), a second being that the base of the strip necessarily drags frictionally and tends to come off and away from the glass as the assembly of glass and strip is being forced over the base B of the metal frame, and a third being that any imperfection in the size of the glass may give rise to difficulty in fitting into the frame but the cause is not apparent because the glass edge is at that time hidden in the U-shaped strip.

The foregoing disadvantages are entirely avoided by the construction according to the present invention. It is seen that the U-shaped strip is composed of the L-shaped limb $E^3$ and the flap $E^4$ connected integrally with the limb $E^3$ by a narrow portion formed by a V-shaped cut $E^5$. The flap $E^4$ initially lies horizontally in or over the channel D of the metal frame as shown in Figure 1 so that no obstruction is offered to the positioning of the glass panel into the L-shaped rubber limb, and, after the glass is positioned, the flap $E^4$ is then turned up as shown in Figure 2, and the finishing strip F is then fitted into co-operative position with it. With this construction it will be understood that there is no frictional drag of a glass-embracing U-shaped strip on the surface of the metal frame base during assembly because the L-shaped limb and finishing strip can be merely laid in position against the metal frame without the glass being present at that stage. Secondly the glass itself is placed in position in the L-shaped limb and in so doing any fault due to the shape of the glass is easily visible. Thirdly the outer base part C of the metal frame can be actually somewhat higher than the base part B and thereby increase the anchorage of the base of the finishing piece F in the channel D of said metal frame.

It will be understood that the L-shaped limb $E^3$ may be actually L-shaped, or the included angle and that of the receiving portion of the metal frame may be slightly less than 90° so that after having pushed the glass panel into position the tendency of the L-shaped limb $E^3$ is to retain the glass even before the flap $E^4$ is folded up. Figure 2 also shows a feature related to the finishing piece F, namely the slight overlap of the base of the U-shaped strip with respect to a toe portion $F^1$ on the finishing piece, the anchorage of the toe portion being thereby improved.

Figure 3 illustrates an improvement on the construction shown in Figures 1 and 2 in that the top edge of the vertical wall of the L-shaped limb $E^3$ is provided with a lip E extending laterally and downwardly to grasp the top edge of the metal wall A of the metal frame.

The provision of the lip E presents the following advantages. It prevents water such as may arise from condensation on the internal face of the window of a vehicle from finding its way into the space between the aforesaid vertical wall of the U-shaped rubber strip $E^3E^4$ and the adjacent vertical wall A of the metal frame. In this way the possibility of rust in the metal channel is entirely obviated. Moreover, the aforesaid vertical metal wall A is itself protected from blows by the buffering action of the rubber overhanging lip.

A further important advantage arises in using a U-shaped rubber strip constituted, as in the construction shown, by an L-shaped limb and a fold-up flap because with such a strip the latter can be placed in position in the metal frame and the lip E can be hooked over the edge of the vertical wall A of the metal frame and thereby keep the strip in position without requiring any adhesive. As will be understood if the L-shaped limb $E^3$ is held in position by its lip as just described and the foldable flap $E^4$ is lying horizontally in line with the base portion of the eventual channel as shown in Figure 1, a glass panel can be advanced bodily into the metal frame to seat itself in the L-shaped limb while the edges of the glass are still exposed. Having placed the glass panel in position the flap $E^4$ is folded up to embrace the glass externally along its edge and finally the finishing piece F is applied.

What we claim is:

1. A mounting for glass panels comprising a metal frame having a channel extending along the base thereof, a glass-receiving substantially U-shaped rubber strip seated on the base of the metal frame and composed of a substantially L-shaped limb and a flap integrally connected by a weakened portion to the outer edge of the base portion of said L-shaped limb and movable into parallel relationship with said base portion and a separate strip-like finishing piece engaging at its base with the said channel of the metal frame and also engaging at one side with the adjacent wall of said substantially U-shaped rubber strip as a buttress therefor.

2. A mounting for glass panels comprising a metal frame having a channel extending along the base thereof, a glass receiving substantially U-shaped rubber strip seated on the base of the metal frame and composed of a substantially L-shaped limb and a flap integrally connected by a reduced portion to the outer edge of the base portion of said L-shaped limb and movable into parallel relationship with said base portion and a separate strip-like finishing piece engaging at its base with the said channel of the metal frame and also engaging at one side with the adjacent wall of the substantially U-shaped rubber strip as a buttress therefor.

3. A mounting for glass panels comprising a metal frame having a channel extending along the base thereof and an upstanding wall, a glass receiving substantially U-shaped rubber strip seated on the base of the metal frame and composed of a substantially L-shaped limb and a flap integrally connected by a weakened portion to the outer edge of the base portion of said L-shaped limb and movable into parallel relationship with said base portion, the free edge of said flap having a flange extending laterally outwards and downwards therefrom, a lip extending laterally outwards and downwards from the free edge of the upstanding portion of the L-shaped limb for overlapping engagement with the top edge of said upstanding wall and a separate strip-like finishing piece engaging at its base with the said channel of the metal frame and engaging also at one side with the adjacent wall of the substantially U-shaped rubber strip as a buttress therefor, the top edge of said finishing piece fitting under said flange on said flap.

4. A rubber strip for embracing the edge of a panel comprising a substantially U-shaped rubber strip composed of a substantially L-shaped limb and a flap integrally connected by a weakened portion to the outer edge of the base portion of said L-shaped limb and movable into aligned relationship with said base portion.

5. A rubber strip for embracing the edge of a panel comprising a substantially U-shaped rubber strip composed of a substantially L-shaped limb and a flap integrally connected by a reduced portion to the outer edge of the base portion of said L-shaped limb and movable into aligned relationship with said base portion.

ALBERT ERNEST DUTFIELD.
ERNEST JOHN RAWLINGS.